3,118,221
METHOD OF MAKING WAFERS WITH DISSEMINATED PARTICLES
Bernard Turovlin and James R. Lindgren, San Diego, Calif., assignors to General Dynamics Corporation, New York, N.Y., a corporation of Delaware
Filed Feb. 26, 1959, Ser. No. 795,715
1 Claim. (Cl. 29—420.5)

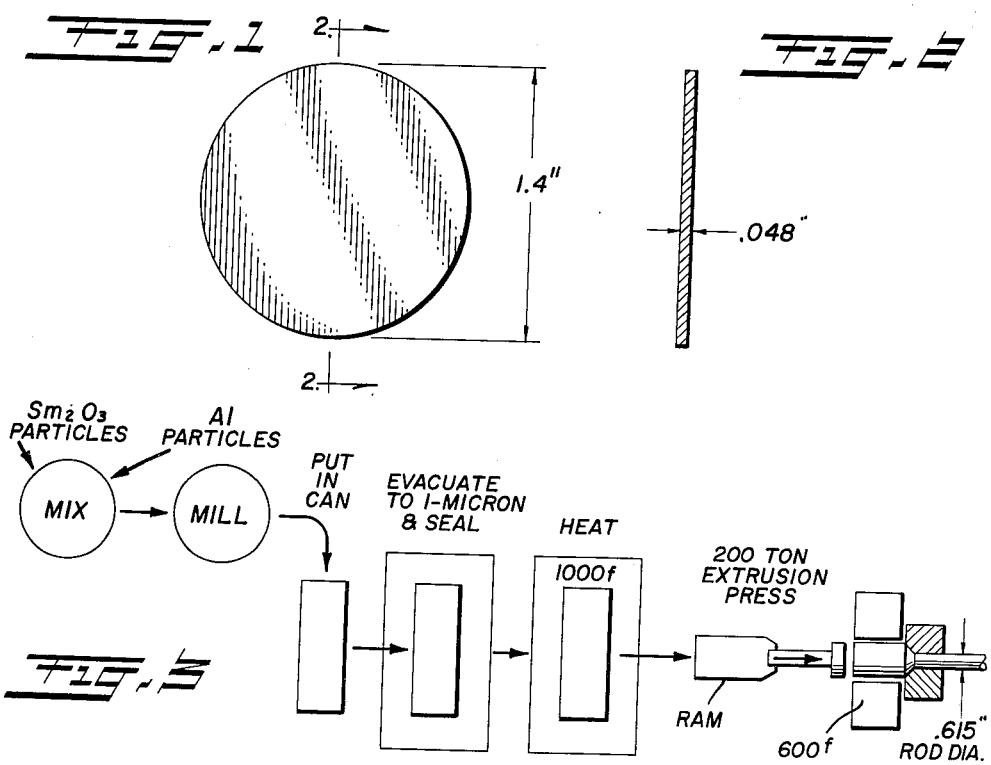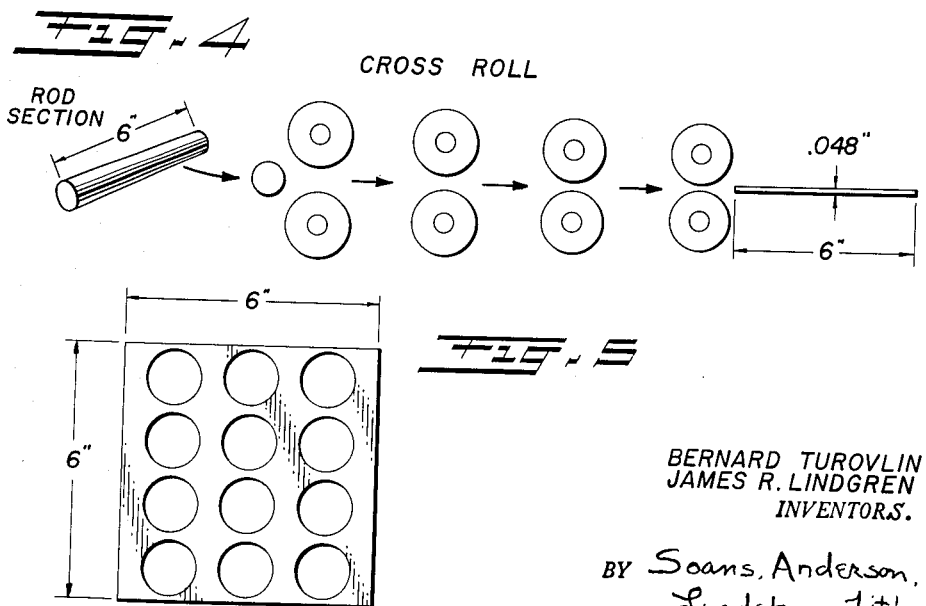

The invention relates to the manufacture of a dispersion of a functional ingredient in a solid metal vehicle wherein the functional substance is distributed through the solid carrier metal not in the form of an alloy, but in particles disseminated through and spaced apart from each other in the carrier metal.

The functional substance is preferably disseminated through the carrier metal in small particles. For certain purposes, the particles may be made quite fine, for example, 325 mesh, or having a maximum particle diameter size of from 10 to 15 microns, or, for some purposes, the particle size may be much larger. Also, depending upon the use, the functional substance may weigh as much as about 15 percent of the weight of the carrier metal, whereas in other cases, the percentage of functional substance may be much lower, for example, 1 percent of the carrier weight.

Preferably, a product made in accordance with our process has a body of malleable metal or metal alloy powder which may be worked or formed into various sizes, shapes or thicknesses, depending upon the purpose for which the product is ultimately to be used. For example, the process may be used in the manufacture of such articles as abrasive elements or tools such as files or grinding wheels. One important application of the invention is in the field of nuclear physics, and particularly in nuclear reactors, where pieces of the material may be employed as components of or adjuncts to the fuel core or assembly.

Although the metal aluminum is particularly well suited for use as the carrier, in many cases other metals, for example, lead, magnesium, copper, nickel, iron, ferrous metals or alloys of the same with other metals, can be successfully employed, depending upon the purpose for which the final product is to be used. However, it is important that whatever metal or alloy be selected as a carrier, it should be capable of self-welding when subjected to a pressure and heated to a temperautre such as can be reasonably well attained in extrusion equipment.

Products made by our process generally are used for purposes which require that the particles of the functional substance be spaced apart from each other, and that that spacing should be maintained during the use of the product. Hence, not only should the particles be properly disseminated or distributed through a mass of small particles of the carrier metal during the initial or mixing stage of the process, but in the latter stages of the process, migration of the particles within the mass to form clusters or aggregates should be prevented as far as possible.

Although products of the general class described may be made by other methods, we prefer to use an extrusion method in which the carrier metal or alloy needs to be heated to a temperature substantially less than the normal fusion or melting temperature of the metal alloy, but sufficiently high so that when the material, in comminuted form, is extruded under heavy pressure, the particles of the metal will be, in effect, welded together to form a solid, homogenous metallic mass. The functional substance, also in particle form, which has been disseminated through the mass of metal particles by a suitable milling or mixing operation prior to the insertion of the mass into the extrusion equipment, according to our method should be of a nature that it will not alloy with the carrier metal at the pressure and temperature condition of the press so that the discrete particles of the substance will not form an alloy with the particles of the carrier metal and will not migrate and form undesirable accretives or nodules composed or two or more particles of the substance.

We are aware that others have heretofore proposed to produce or have produced what may be called self-welded metallic bodies made from metallic particles in an extrusion press under heavy pressure at temperatures below the fusing point of the metal, and that such proposals have involved the production of alloys by the use of mixtures of particles of different metals.

The drawings accompanying this description illustrate a specific example of the invention as used in the manufacture of a malleable metallic product from which can be made a disc or wafer containing as a functional substance a small amount of samarium oxide ($Sm_2O_3$), aluminum metal being used as a carrier. Such a disc or wafer may be effectively employed as an adjunct or component of the fuel system of a nuclear reactor.

In the drawings:
FIGURE 1 is a plan view of the disc or wafer;
FIGURE 2 is a section taken on the line 2—2 of FIGURE 1;
FIGURE 3 is a diagrammatic view of a flow sheet showing the process for producing an extruded rod;
FIGURE 4 is a diagrammatic view showing the process of cross-rolling one of the rod sections; and
FIGURE 5 is a plan view of the cross-rolled sheet after the discs have been punched therefrom.

*Example*

The carrier in the present instance is a metal of low neutron cross section, which is preferably capable of being cold-welded when reduced to small particle size. Aluminum is such a metal. By means of conventional methods not necessary to describe here, the aluminum metal is prepared in finely divided form. Preferably, at least approximately 99 percent of the mass has a particle size less than 325 mesh (.044 mm.).

The functional substance in the specific example described is samarium oxide ($Sm_2O_3$). This is also converted to fine particles by conventional equipment or methods so that 99 percent of it will go through a 200 mesh screen (0.074 mm.). Samarium metal melts at 1350° C. (2440° F.), and the oxide cannot be welded at a temperature of 1000° F. at the pressure we employ.

The aluminum and samarium oxide may be charged alternately and in several increments into a Patterson-Kelly Model 1646 Twin-Shell Blender. The powder may be used in the "as received" condition, and in such proportion that at the conclusion of the mixing operation, the mass contains approximately 1.16% by weight of $Sm_2O_3$ powder. After mixing has been carried on for a period of one hour, the mass is sent through a Weber Brothers Laboratory Pulverizing Mill (.008" screen), which eliminates aggregates or conglomerated particles.

The powder mixture is then canned by charging it into a hollow cylinder made of aluminum of 3S grade having an external diameter of 3½", with a 0.216" wall to which end plates ¼" thick of aluminum of 3S grade may be welded by the heliarc process. One end of the can is equipped with a ⅜" O.D., ¼" I.D. aluminum tube for evacuation. All components of the can are thoroughly cleaned prior to canning. After evacuating for three hours to a pressure of approximately one micron, the evacuation tube is sealed.

The filled and evacuated cans are then placed in a billet furnace and heated to a temperature of 1000° F. (The fusion temperature of aluminum is about 658° C. or 1220° F.) This temperature of 1000° F. is held for three and one-half hours prior to extrusion.

The extrusion operation is performed as soon as possible after the can is removed from the billet furnace. The extrusion press may be of any conventional type, and preferably is of such size that the chamber can snugly receive the can which is preferably located in line with the axis of the ram. The ram may be of the same diameter as the external diameter of the can, i.e., 3½" diameter, so that the extrusion ratio works out at about 31.4 to 1 when using a die having a ⅝" diameter orifice, and is capable of exerting a pressure of at least 200 tons.

Preferably the press is heated to such a temperature that the die in which the extrusion orifice, of a diameter of ⅝", is located, maintains a temperature of about 600° F., or more. To facilitate the extrusion operation, the charge is forced into the die through a conical throat, the walls of which are inclined to the axis of the extrusion chamber about 45°, so that the apical angle of the cone is about 90°. Also, to facilitate the operation, the die preferably is lubricated by any conventional material or substance normally used in extrusion processes, for example, the compound sold under the designation "Spray-Graph" manufactured by American Resin Corporation, Chicago, Illinois, and consisting largely of trichlorethylene and graphite powder dispersion.

During the extruding operation, the can serves as a means for containing or retaining the powdered mixture within the can when the filled can is being squeezed through the orifice of the extrusion press. Obviously the shell of the can is also squeezed out into a shell which is thinner and of smaller diameter than the shell of the can, and serves as a cladding skin on the outside of the rod-like welded mass which is forced out of the extrusion orifice.

The resulting rod, when using a can having a length of 7½", was about 135" long and 0.615" in diameter. Although the temperature in the can and the temperature of the press were both considerably below the melting point of aluminum, the pressure, notwithstanding the relatively low temperature, was of such order of magnitude, as in the case of other metals when subjected to such treatment, that it served in effect to "cold weld" the particles of aluminum together to form a concrete mass without actually causing complete liquefaction of the aluminum. Although the welding effect apparently results in a complete integration of the particles of aluminum, the particles of samarium oxide apparently maintain their spaced relationship in the mass, and do not coalesce to form larger aggregates. Any significant change in the spacing or uniformity of distribution of the mass is not apparent. Furthermore, the rod appears to have the physical characteristics of a solid rod of aluminum metal, although the individual particles of samarium oxide can be detected by microscopic examination.

After trimming off the ends of the rod, the remainder of the rod is cut into sections or parts six inches long and each of these six inch lengths is cross-rolled in a cold condition to a thickness of .048 inch. This cross-rolling can be accomplished in any conventional roll mill. In this case, a 8 x 10 Stanat TA–625 mill may be used, with a reduction in thickness of from 15–20% per pass. The rod or strip need not be annealed at any time during rolling.

The resulting sheet from each six inch length after rolling is approximately six inches by six inches. A width of approximately ⅞" is discarded from the front and rear edges of the sheet, since they contain a large fraction of the outer cladding. Then, by means of a conventional die, there are punched from the sheet 12 discs, each having a diameter of 1.415". Each disc weighs about 3 grams. The discs may be placed at the outer ends of the fuel rods in the core of the fuel system.

Particularly in the case of the specific example herein described, an evacuation step is important or desirable for preventing bubbles of air or other gas from forming within the mass during any subsequent step of the process.

In view of the fact that the metal aluminum in the specific example has no technical purpose except as a carrier for the particles of samarium oxide, the functional substance which is disseminated through the welded mass of aluminum, it is not necessary to remove the aluminum skin from the extruded rod. However, if it is desired to use the process for the manufacture of such articles as abrasive elements, at the conclusion of the operation of working the rod into different shapes of elements, and if it is desired to expose the particles of functional substance on the exterior of the element, the outer skin of cladding metal may be removed chemically, electrolytically or by any other conventional manner.

Various features of the invention are set forth in the appended claim.

We claim:

The process of making solid wafers containing disseminated particles of samarium oxide in sufficient amount to enable the wafers to function as useful components of the fuel system of a nuclear reactor, which comprises making a mixture which includes a major percentage of finely divided aluminum and a useful percentage of samarium oxide of a particle size of about 200 mesh distributed through said mixture, sealing said mixture in a metallic envelope in vacuo, heating the sealed mixture to a temperature below the fusion temperature of aluminum, then extruding the mass through a die orifice at a temperature also below said fusion point, but at a sufficiently high pressure to weld together the particles of aluminum so as to form an extruded, malleable rod, then propelling a section of said rod through a series of pressure rolls until the thickness of the material is reduced so as to form a sheet having a predetermined concentration of samarium oxide per unit of area, and then cutting said sheet into sections, while maintaining the temperature of the mixture throughout the process below that at which the aluminum will fuse or form an alloy with the samarium oxide, so that the particles of samarium oxide will retain their separate identity and their disseminated state throughout the mass of aluminum.

References Cited in the file of this patent

UNITED STATES PATENTS

| | | |
|---|---|---|
| 2,290,734 | Brassert | July 21, 1942 |
| 2,727,996 | Rockwell et al. | Dec. 20, 1955 |
| 2,805,473 | Handwerk et al. | Sept. 10, 1957 |
| 2,843,539 | Bornstein | July 15, 1958 |
| 2,859,163 | Ploetz | Nov. 4, 1958 |
| 2,866,741 | Hausner | Dec. 30, 1958 |
| 2,885,287 | Larson | May 5, 1959 |
| 2,917,821 | Fritsch | Dec. 22, 1959 |
| 2,922,223 | Boughton et al. | Jan. 26, 1960 |

OTHER REFERENCES

Positive Control Rods Worth of Some Rare Metal Oxides. See Nuclear Science Abstracts, November 15, 1959, Item 19, 699, page 2641.